Figure 1:
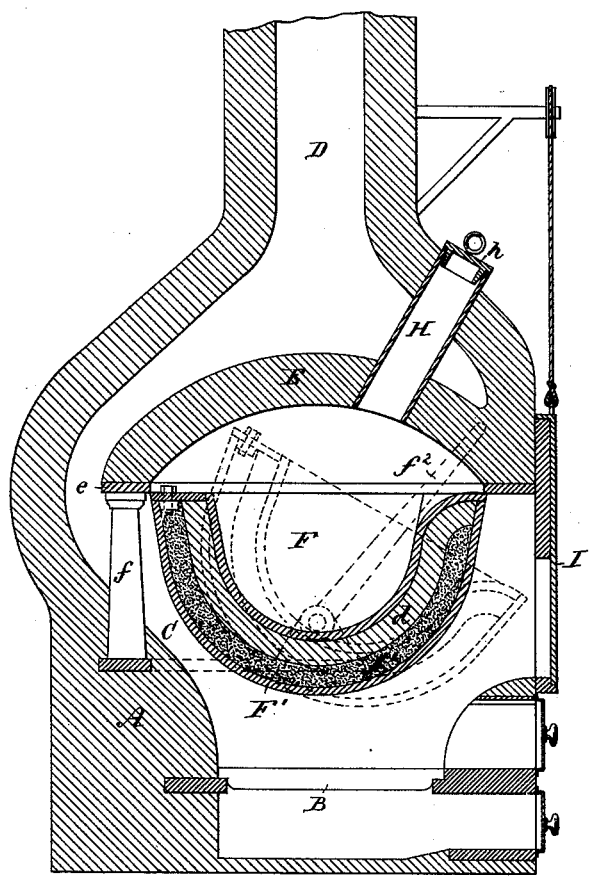

(No Model.) 6 Sheets—Sheet 1.

C. PAYEN.
PROCESS OF MANUFACTURING POROUS METAL PLATES.

No. 415,330. Patented Nov. 19, 1889.

WITNESSES:
Hermann Bormann.
Thomas M. Smith.

INVENTOR:
Clement Payen,
By J. Walter Douglass.
Atty.

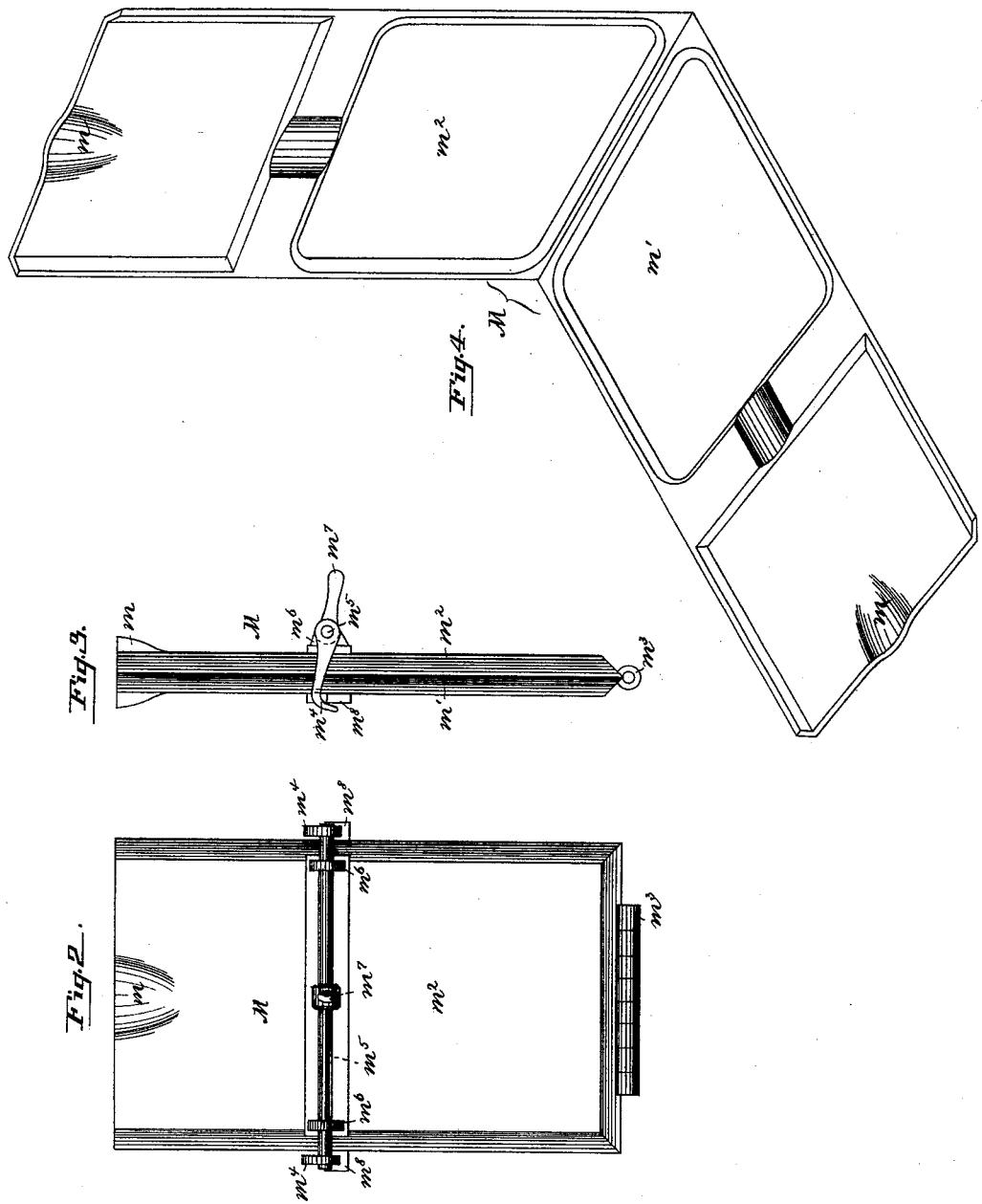

(No Model.) 6 Sheets—Sheet 3.
C. PAYEN.
PROCESS OF MANUFACTURING POROUS METAL PLATES.
No. 415,330. Patented Nov. 19, 1889.
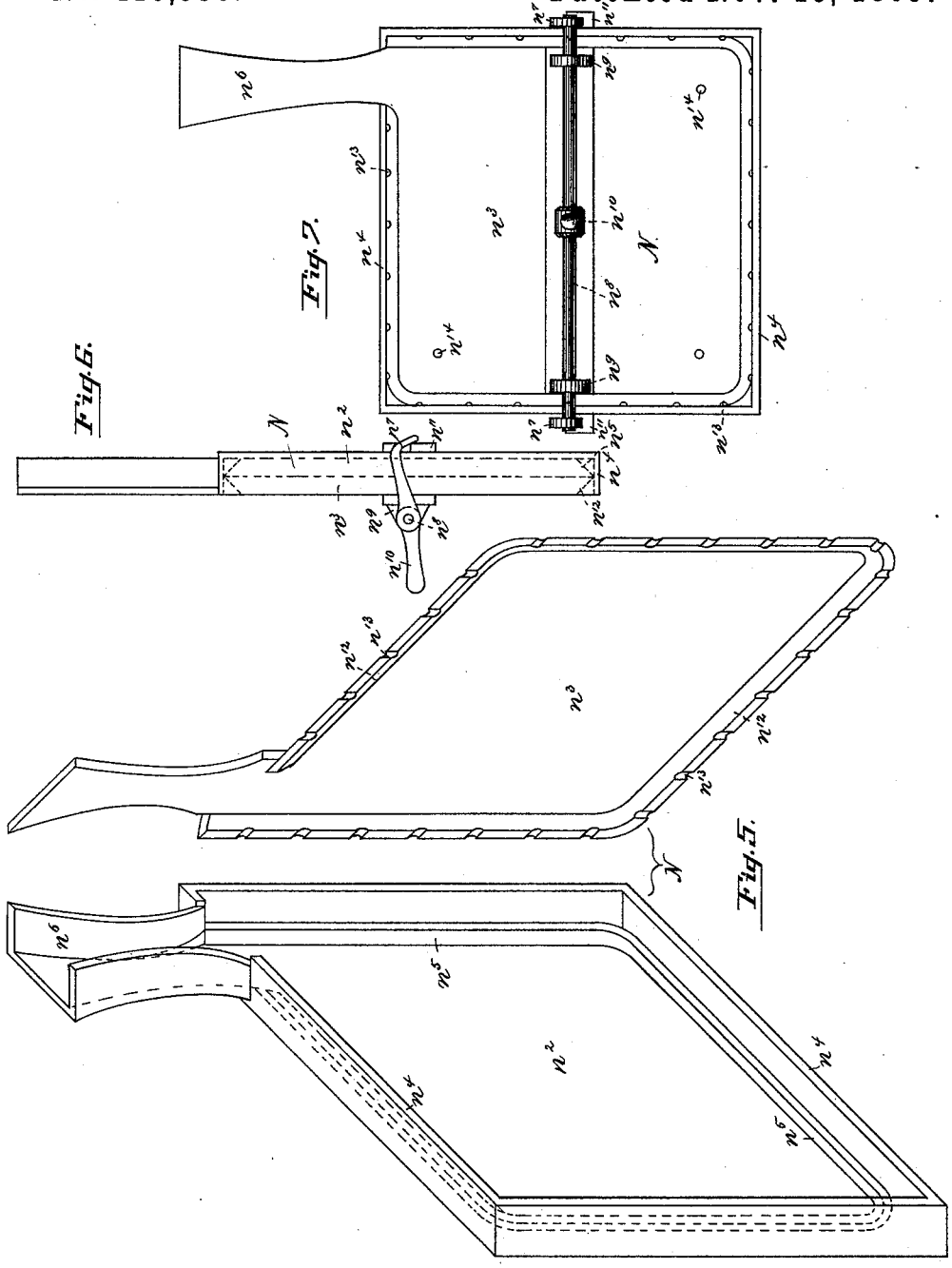
WITNESSES:
Hermann Bormann
Thomas M. Smith.
INVENTOR:
Clement Payen,
By J. Walter Douglass.
Atty.

(No Model.) 6 Sheets—Sheet 4.
C. PAYEN.
PROCESS OF MANUFACTURING POROUS METAL PLATES.
No. 415,330. Patented Nov. 19, 1889.
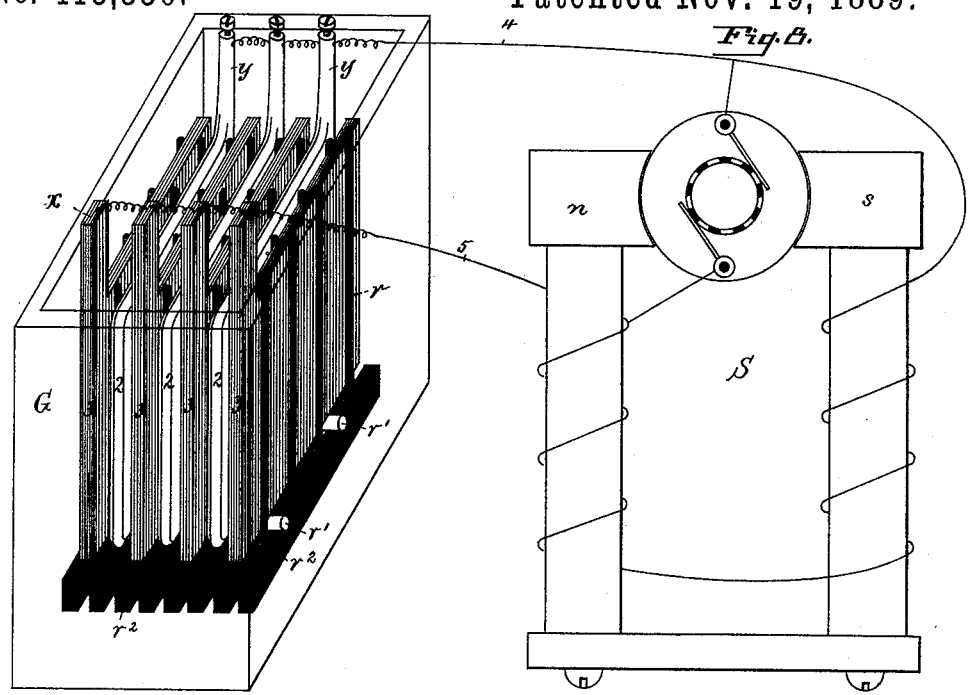
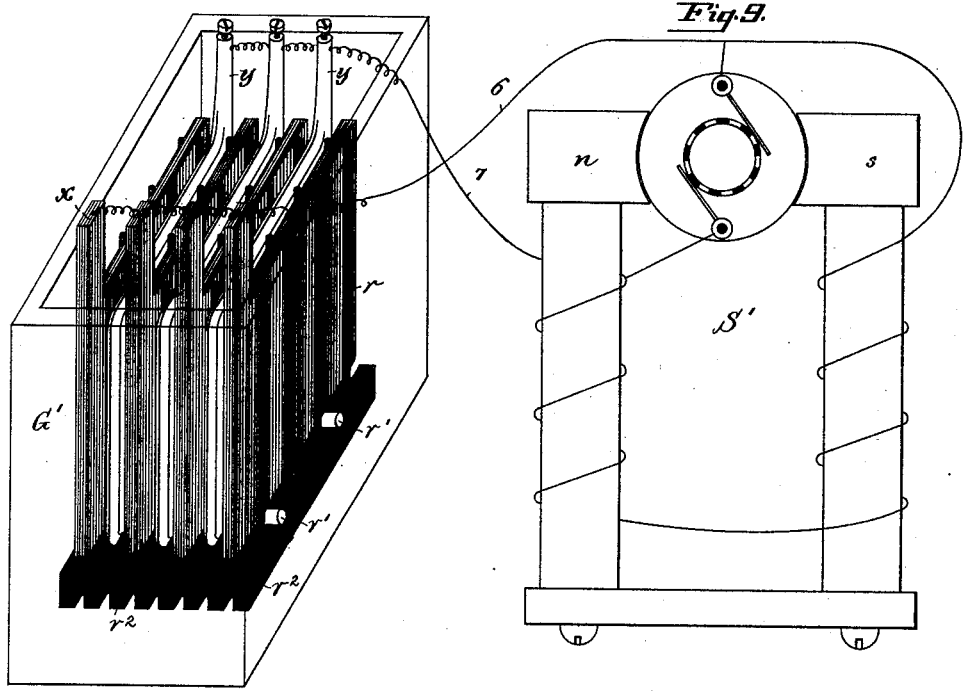
WITNESSES:
INVENTOR:

(No Model.) 6 Sheets—Sheet 5.

C. PAYEN.
PROCESS OF MANUFACTURING POROUS METAL PLATES.

No. 415,330. Patented Nov. 19, 1889.

WITNESSES:
Hermann Bormann
Thomas M. Smith

INVENTOR:
Clement Payen,
By J. Walter Douglass.
Atty.

(No Model.) 6 Sheets—Sheet 6.
C. PAYEN.
PROCESS OF MANUFACTURING POROUS METAL PLATES.
No. 415,330. Patented Nov. 19, 1889.
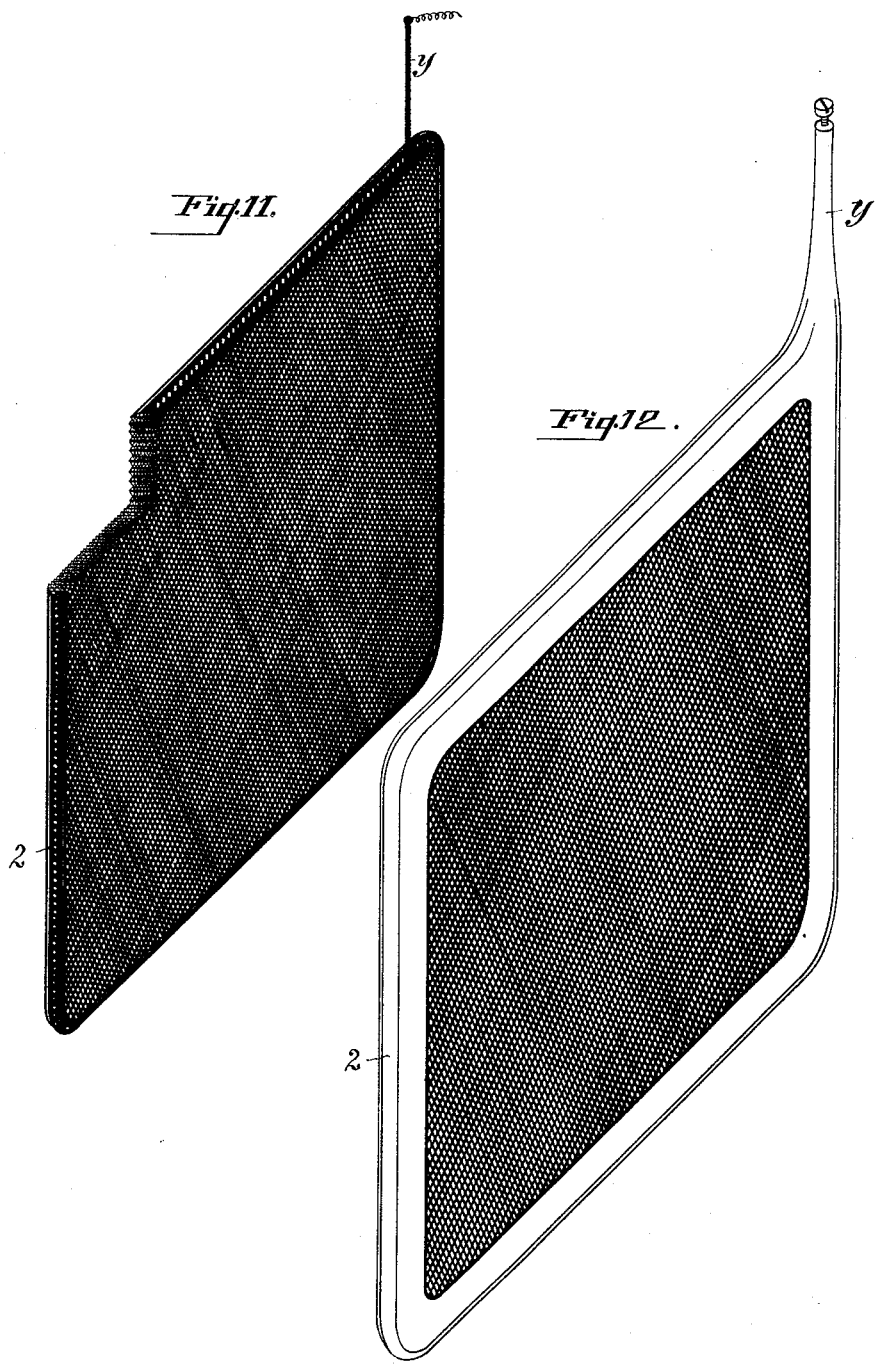
WITNESSES:
Hermann Bormann.
Thomas M. Smith.
INVENTOR:
Clement Payen,
By J. Walter Douglass.
Atty.
N. PETERS, Photo-Lithographer, Washington, D. C.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF MANUFACTURING POROUS METAL PLATES.

SPECIFICATION forming part of Letters Patent No. 415,330, dated November 19, 1889.

Application filed June 12, 1888. Serial No. 277,154. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Process of Manufacturing Porous Crystallized Metal Plates, of which the following is a specification.

My invention relates to improvements in the method of constructing plates or elements of a secondary or storage battery.

The principal object of the invention is to produce a strong metal plate or other structure having the crystals existing in columns with cells between them.

My invention consists in fusing a salt or chloride of lead with the metal zinc or a salt or chloride of cadmium, or a combination of a salt or chloride of lead with the metal zinc and a salt or chloride of cadmium in variable proportions, the salt or chloride of cadmium and metal zinc being combined with the salt or chloride of lead either before, during, or at the moment the point of fusion of the salt or chloride of lead is reached, and the fused mass or compound then discharged into a mold to cause the same by preferably a rapid cooling to assume a strong crystallized form, then removing the structure into another mold to permit of a frame of lead or other material to be cast around said structure, and then reducing the same to a metallic state and eliminating therefrom all elements which do not form a part of the metal required, whereby a strong porous crystallized metal plate or other structure will be obtained especially adapted for use as an element of a secondary or storage battery.

The framing step of the process may be dispensed with entirely, and platinum, aluminium, or other wires may be inserted directly into the plates or structures, if so desired. On the other hand, when framing is resorted to, it may be carried out after the reduction of the structure to a metallic state as well as before; and such being the case I do not wish to limit myself to conducting the several steps of the process precisely in the order hereinabove given, but reserve the right to modify them in such manner as may be deemed advisable in the more extended practice of the invention without departing from the real spirit thereof, which is to produce a strong porous crystallized metal plate or other structure.

In the accompanying drawings I have illustrated apparatus for the conduct of my method of producing crystallized porous metal lead plates or other structures and in such forms as have been found practically efficient, and in which—

Figure 10:
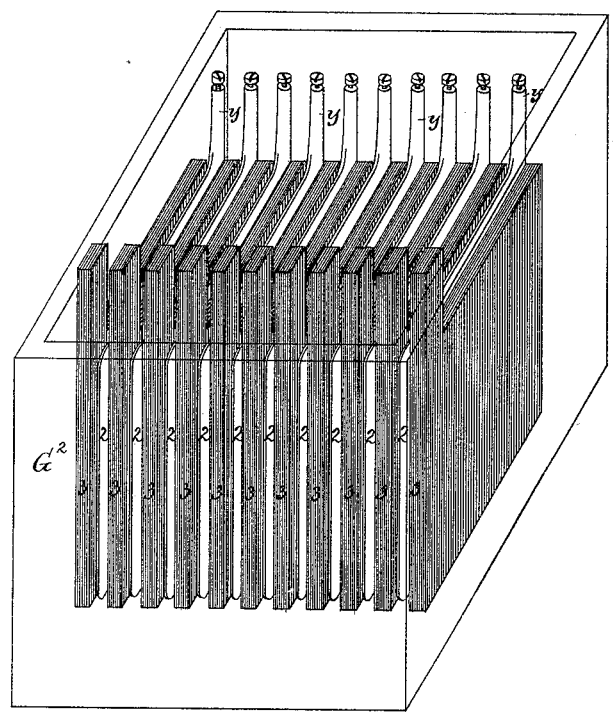

Figure 1 is a vertical central section through a melting-furnace of my improved construction, showing the crucible pivotally supported therein and operated by a lever for discharging the contents thereof. Fig. 2 is a top or plan view of a two-part mold, showing also the means for clamping the same together. Fig. 3 is an end view thereof. Fig. 4 is a perspective view of said two-part mold, showing the interior formation thereof. Fig. 5 is a perspective view of a bivalved framing-mold. Fig. 6 is an end view of said bivalved mold clamped together. Fig. 7 is a top view of said bivalved mold with its clamping device. Figs. 8 and 9 are diagrammatic views showing the process of reducing the crystallized plates to a metallic state with the elimination of all elements foreign to the metal required by electrolytic action. Fig. 10 is a perspective view of a receptacle or cell with a series of crystallized plates in contact with a series of metal, zinc, or other plates of the same dimension, said plates mounted therein being immersed in a solution of water and preferably sal-ammoniac for causing the crystallized plates to be reduced to a metallic state by chemical action; and Figs. 11 and 12 are views in perspective of the porous crystallized metal plates, showing in the former a plate with a platinum or other suitable wire inserted into it and forming a terminal or conductor, and the latter view showing a plate with a frame cast around it and provided with a lug forming a terminal or conductor.

Referring to the drawings, A is a furnace constructed of brick or other material.

B is a grate located and supported in the lower part of the furnace.

C is the draft-flue of the furnace for conducting the fumes or gases off into the chimney D.

E is an arch made of brick or other refractory material in the upper part of the furnace, and which is supported in position on an annular plate $e$, with a central opening therein. The plate $e$ is held in position by means of columns $f$, arranged and supported in the brick-work of the furnace in any suitable manner.

F is a porcelain crucible or melting-pot, open at the top, and around the outer circumference of which is formed a layer $d$ of amianthus, asbestos, or other similar material, and between this layer $d$ and the metallic pot $F'$ is a layer of sand $f'$. The metal pot $F'$ is pivotally supported in a central position within the furnace and is operated from the outside by a lever $f^2$, attached to one of the journals of the metal pot $F'$, whereby the crucible F may be readily tilted for discharging the contents thereof into a suitable receptacle for further treatment.

H is an inclined metal hopper provided with a removable stopper $h$, to permit of the charging of material into the crucible F.

I is a sliding door, operated by simple means to allow of the discharge of the molten mass or compound into a mold by the tilting of the crucible F by means of the lever $f^2$.

Having described the melting-furnace, I will now proceed to describe the first step in the process of manufacturing a crystallized porous metal lead plate or other structure. I take a charge of chloride of lead, and to which I add two per cent., by weight, of metallic zinc, more or less, or two per cent., by weight, of chloride of cadmium, more or less, or I combine with a charge of chloride of lead two per cent., by weight, of metallic zinc and chloride of cadmium, more or less. The metallic zinc I prefer to add before the fusion of the charge, yet nevertheless it may be added to the charge of chloride of lead at the moment the point of fusion thereof has been reached. The chloride of cadmium may be added to or combine with the charge of chloride of lead either before or during the fusion thereof. When chloride of lead is fused alone, I have found in practice that such a mass, after having assumed a crystallized form, will be apt to be more or less brittle or fragile. The addition or combination with chloride of lead of metallic zinc and chloride of cadmium increases the strength of the plate and gives a better character of crystallization in the structure, and then the lead composing the plate constructed from said materials, after the elimination of the chlorides therefrom by electrolytic or chemical action, will be brought to a porous crystallized metallic state especially adapted for use as an element of a secondary or other battery. It should be observed that the percentage of metallic zinc and chloride of cadmium, combined with the charge of chloride of lead, will in each case depend upon the degree of porosity and strength desired in the finished product. The charge, composed of chloride of lead and metallic zinc and chloride of cadmium, having been subjected to fusion in the manner described, the fused mass or compound is then discharged into a mold M. The selection of material for the mold M is of some importance, and the interior surface thereof should be perfectly smooth. I have found that molds made of malleable or cast iron become deteriorated in a short time by use owing to the tendency of the chlorides to adhere to the sides thereof. The material to which preference is given for the formation of the mold is either brass or bronze, the mold being composed of two symmetrical parts or sections $m'$ and $m^2$, chamfered as shown in Fig. 4, the two parts, hinged together at $m^3$, being firmly clamped together by means of catches $m^4$, mounted on the extremities of a shaft $m^5$, which is held in bearings $m^6$, formed with one of the sections, and operated by a lever $m^7$, as shown, for instance, in Figs. 2 and 3, these catches $m^4$ being caused to engage by the actuation of the lever $m^7$ with a strip $m^8$ on the opposite part of the mold M. The metal mold M may be constructed in two parts of either equal or unequal thicknesses of metal, according to the materials, to assume a solid form therein. In the use of a mold having the two parts or sides of equal thicknesses of metal a fused mass or compound will commence to cool from each side of the mold, and the crystals, in the form of polyhedrons composing said mass or compound, will meet or unite with each other at their sides, facets, or summits uniformly throughout the structure from each side of the mold. In the use of a mold having the two parts or sides of unequal thicknesses of metal the fused mass or compound charged into the mold will cool therein unequally, thereby causing the crystals to assume a fixed position in the structure faster from the side of the mold having the greater thickness of metal than those assuming a fixed position in the structure from the opposite side of the mold having a less thickness of metal. Such being the case, the crystals forming into columns from one side of the mold will meet or unite with those forming into columns from the opposite side of the mold beyond the median line of the plate or other structure. I have found that plates formed in molds having the sides of equal thicknesses of metal when reduced to a metallic state by electrolysis or chemical action, or both, to be herein-after fully described, possess a maximum degree of porosity and strength, and are especially adapted for use as the elements of secondary or other batteries. I prefer to use a mold having the two sides of equal thicknesses of metal for causing the fused mass or compound in cooling to assume a crystallized form. In a few minutes after the molten or fluid mass or compound has been charged into the mold M it will assume a substantial crystallized form, in the manner hereinabove described. Previous to charging the fused mass or compound into the mold M it may be heated to a temperature, of, say, 150° centigrade, more or less, and still obtain excellent results in the crystallization of the combined mass therein. After the crystallized plate has become cool or perfectly cold the mold M is unclamped and the crystallized plate removed into a framing-mold N, for casting a frame of lead or other suitable material around the same. The bivalved framing-mold N consists of two sections $n^2$ and $n^3$, made of cast-iron or other suitable material. A flange $n^4$ is formed around the sides of the section $n^2$, when the mold is in the form of a rectangular parallelopipedon with a beveled flange or rim $n^5$ around the bottom and with a funnel-shaped neck $n^6$ for the introduction of material into the mold when the two sections $n^2$ and $n^3$ are clamped together by means of the catches $n^7$, attached to each extremity of the shaft $n^8$, which is held in bearings $n^9$, secured to the exterior surface of the section $n^3$, this shaft being actuated by means of a lever $n^{10}$, which causes the catches $n^7$ to engage with a strip $n^{11}$, secured to the opposite section $n^2$ of the mold. The section $n^3$ of the mold has a beveled rim $n^{12}$, corresponding with the rim $n^5$ of the section $n^2$ of the mold, in the sides or edges of which are formed a series of grooves $n^{13}$, forming air-vents when the two sections are clamped together. In the section $n^3$, as shown in Fig. 7, two or more openings $n^{14}$ are formed at suitable distances apart for the introduction of pins to hold the crystallized plate in proper position in the mold while lead or other suitable material in a liquid state is being poured into the mold to become cast around the plate in the form of a beveled frame with a terminal $y$ to form a conductor. When the frame around the crystallized plate has become perfectly solid, it is then removed for further treatment or reduction to a metallic state by electrolytic or chemical action, or both, in the following manner: A series of crystallized chloride plates treated in the above-described manner is now placed in a vase G, containing water and sulphuric acid in the proportion of ten per cent., more or less. The crystallized plates 2, immersed in the solution in the vase G, are alternated with plates of equal dimensions, composed of lead or artificial charcoal 3, each having a terminal $x$, all the crystallized plates 2 being connected through their terminals $y$ with a wire 4, while the lead or charcoal plates 3 are connected through their terminals $x$ with a wire 5. The two systems of plates are insulated from each other by means of insulating-rods $r$ and from the vase G by means of the insulators $r'$, mounted on the horizontal rods $r^2$ in the bottom of the vase G, as shown in Fig. 8, the system of crystallized plates or cathodes being connected with the negative electrode $s$ of the dynamo S, while the system of lead or charcoal plates or anodes are connected with the positive electrode $n$ of the dynamo S. The crystallized plates thus treated are then removed and immersed in another vase G', containing water and sulphuric acid in about the same proportions as hereinbefore mentioned. In this second vase G' the crystallized plates are again alternated with others of ordinary lead or artificial charcoal, as in the previous instance, and the two systems of plates, insulated, respectively, from each other and the vase G, are again connected by two separate wires 6 and 7 with the positive and negative electrodes $n$ and $s$ of a dynamo S', as in the first instance mentioned, with this exception, that the negative electrode $s$ is connected with the system of lead or charcoal plates through the terminals $x$, while the positive electrode $n$ is connected with the system of crystallized plates through the terminals $y$, as shown in Fig. 9. By the second electrolytic action which takes place the zinc and cadmium metals are deposited on the lead or charcoal plates and the oxygen caused to attack the crystallized plates.

In Fig. 10 I have shown another method of reducing the crystallized chloride plates to a metallic state by chemical action, and which may be carried out in the following manner: In a vase $G^2$, containing a solution of a chloride of salt and water, preferably dilute sal-ammoniac in the proportion of five to ten per cent., more or less, a series of the crystallized plates is arranged alternately in contact with a series of metallic zinc or other suitable plates of equal dimensions. The best results are obtained by selecting metallic or other plates for contact with the crystallized plates having a greater affinity for the foreign elements contained in said crystallized plates than the crystallized plates have for such elements. Then in preparing the solution wherein to immerse the plates it is better if such solution should consist in part of a salt belonging to the same family or class as the salt of which the crystallized plates are mainly composed. If a series of crystallized plates 2, arranged in contact with a series of metallic zinc plates 3, of equal dimension, be immersed in a solution composed of sal-ammoniac and water in a vase or cell $G^2$ for from twelve to fifteen hours, more or less, the effect produced by the chemical action taking place upon the crystallized plates will be to eliminate the chlorine contained in said chlroide plates, thereby leaving the crystallized plates in a porous metallic state with substantial strength. The crystallized porous metal plates treated by chemical or electrolytic action, or both, may then be removed from the vase $G^2$ and thoroughly washed and then dried by a gentle fire, whereby they will be brought to a chemically pure porous crystallized metal state in a form, as illustrated in Figs. 11 or 12, for use as the plates or elements of secondary or other batteries.

In my applications for Letters Patent, Serial No. 261,953, of January 26, 1888; No. 264,503, of February 18, 1888; No. 266,949, of March 12, 1888; No. 267,400, of March 16, 1888, and No. 275,634, of May 31, 1888, the same process is described as in this application; but the invention is not claimed herein in the same manner.

Having thus described the nature and objects of my invention, what I claim as new, and desire to secure by Letters Patent, is—

1. The method of manufacturing a porous crystallized metal plate, which consists in fusing with a salt of lead, metal zinc, and a salt of cadmium, then pouring the mass into a mold and allowing it to cool and crystallize therein, and then reducing the same to a metallic state, substantially as and for the purposes set forth.

2. The method of manufacturing a porous crystallized metal plate, which consists in fusing with a salt of lead, metal zinc, and a salt of cadmium, then pouring the mass into a mold and allowing it by a rapid cooling to crystallize therein, and then reducing the plate by chemical reaction to a metallic state and eliminating extraneous matter therefrom, substantially as and for the purposes set forth.

In witness whereof I have hereunto set my hand in the presence of two subscribing witnesses.

CLÉMENT PAYEN.

Witnesses:
FRANK C. LEWIN,
J. WALTER DOUGLASS.